United States Patent [19]

Fujieda

[11] Patent Number: 5,708,497
[45] Date of Patent: Jan. 13, 1998

[54] FINGERPRINT IMAGE INPUT APPARATUS AND METHOD OF PRODUCING THE SAME

[75] Inventor: Ichiro Fujieda, Tokyo, Japan

[73] Assignee: NEC Corporation, Tokyo, Japan

[21] Appl. No.: 692,277

[22] Filed: Aug. 5, 1996

[30] Foreign Application Priority Data

Aug. 15, 1995 [JP] Japan ................................. 7-208027

[51] Int. Cl.$^6$ ................................................. G06K 9/74
[52] U.S. Cl. ........................ 356/71; 250/556; 340/146
[58] Field of Search .............................. 356/71; 250/556, 250/227.11; 340/146

[56] References Cited

U.S. PATENT DOCUMENTS

4,206,441  6/1980  Kondo ............................................ 356/71
4,358,677  11/1982  Ruell et al. ................................... 356/71
5,446,290  8/1995  Fujieda et al. ............................... 250/556

*Primary Examiner*—Frank G. Font
*Assistant Examiner*—Reginald A. Ratliff
*Attorney, Agent, or Firm*—Sughrue, Mion, Zinn, Macpeak & Seas, PLLC

[57] ABSTRACT

The fingerprint image input apparatus includes two-dimensional image sensor 14 formed on transparent substrate 21 and including diffraction grating 41, photo-sensitive elements 24, switch elements 22, switching lines 25, signal reading lines 26, bias applying lines 27, and light interception plates 23 disposed below photo-sensitive elements 24, planar light source 11 and transparent protective film 42. Diffraction grating 41 is formed on two-dimensional image sensor 14 together with photo-sensitive elements 24 commonly using one or more opaque materials of photo-sensitive elements 24.

9 Claims, 9 Drawing Sheets

FINGERPRINT IMAGE INPUT APPARATUS AND METHOD OF PRODUCING THE SAME

BACKGROUND OF THE INVENTION

1. Field of the Invention

This invention relates to a fingerprint input apparatus, and more particularly to a thin fingerprint image input apparatus.

2. Description of the Related Art

Figure 1:
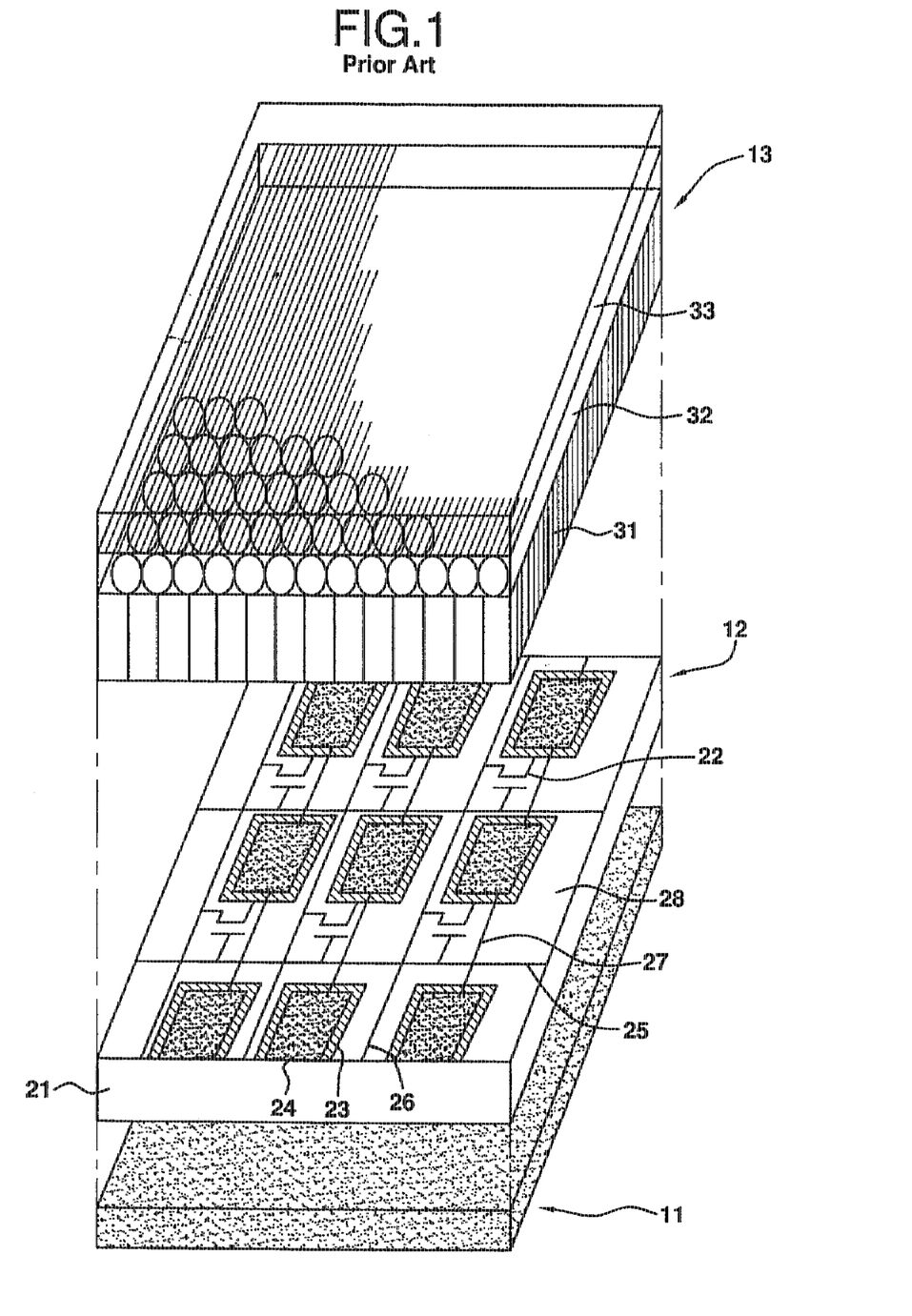
FIG. 1 is an exploded perspective view of a prior art example.

In the prior art, a small fingerprint image input apparatus has been proposed having optical means for optically emphasizing concaves and convexes of a fingerprint in combination with a close contacting type image sensor (U.S. Pat. No. 5,446,290). FIG. 1 shows an exploded perspective view of an example of the conventional fingerprint image input apparatus. Referring to FIG. 1, the conventional apparatus has a construction wherein transparent substrate 21, planar light source 11 and optical element 13 which defines optical paths. Two-dimensional image sensor 12 having openings 28 through which light can pass is formed on transparent substrate 21.

A back light module for a liquid crystal display or an EL planar light emitting element can be utilized for planar light source 11. Meanwhile, two-dimensional image sensor 12 is constructed such that a plurality of picture elements each formed from photo-sensitive element 24 and switch element 22 are arranged two-dimensionally on transparent substrate 21 and those elements are interconnected by switching lines 25, signal reading lines 26 and bias applying lines 27.

Further, optical element 13 which defines optical paths is composed of diffraction grating 32 combined with collected fiber member 31 and transparent protective film 33. The shapes of the components of optical element 13 are determined so that light may be focused upon a finger contacting area of transparent protective film 33 located on center lines of openings 28 provided for photo-sensitive elements 24 of two-dimensional image sensor 12.

Operation of the conventional apparatus is described below. Light emitted from planar light source 11 passes through openings 28 of two-dimensional image sensor 12 and collected fiber member 31, and then its passage is bent by diffraction grating 32 so that it comes to the finger contacting area of transparent protective film 33. When no finger is in contact with the surface of transparent protective film 33, the light is totally reflected from the surface of transparent protective film 33. Consequently, almost all of the light follows symmetrical light paths and comes to photo-sensitive elements 24 in the same picture elements.

On the other hand, when a finger (ridge lines of a fingerprint) is in contact with the surface of transparent protective film 33, the requirement for total reflection is not satisfied, and only a little amount of light comes to photo-sensitive elements 24. Consequently, non-satisfaction of total reflection of the ridge lines of the fingerprint in the contacting area can be detected by transparent protective film 33 corresponding to photo-sensitive elements 24. In particular, a fingerprint image having an optically enhanced contrast is obtained by the principle of fingerprint image enhancement by total reflection.

While the conventional fingerprint image input apparatus described above is characterized in that it can be constructed with a comparatively small thickness, it is necessary, as a method of production of the apparatus, to produce optical element 13 formed from a diffraction grating or the like and adhere optical element 13 to two-dimensional image sensor 12 produced separately. Consequently, since a cost for independent production of optical element 13 is required and besides a time and a material for adhering optical element 13 at an accurate position to two-dimensional image sensor 12 are required, the conventional fingerprint image input apparatus is disadvantageous in that it requires a high production cost.

SUMMARY OF THE INVENTION

The present invention has been made in view of the foregoing, and it is an object of the present invention to provide a fingerprint image input apparatus which reduces production cost and provides a method of producing the fingerprint image input apparatus.

It is another object of the present invention to provide a fingerprint image input apparatus of a small size.

In order to attain the objects described above, according to an aspect of the present invention, there is provided a fingerprint image input apparatus, characterized in that it comprises a planar or linear light source, an image sensor provided on the light source and including a transparent substrate, and a transparent protective layer provided on the image sensor and having a surface with which a finger can contact, that the image sensor at least includes a plurality of photo-sensitive elements arranged regularly, a plurality of switch elements for individually switching outputs of the photo-sensitive elements, and a diffraction grating disposed at a location other than the photo-sensitive elements and the switch elements, and photo-sensitive elements, the switch elements and the diffraction grating being formed on the transparent substrate, and that the transparent protective film totally reflects light emitted from the light source and diffracted by the diffraction grating so that the light is introduced into the photo-sensitive elements.

The fingerprint image input apparatus is further characterized in that each of the photo-sensitive elements includes a lower electrode formed from an opaque material, a photo-sensitive material formed on the lower electrode, and an upper transparent electrode formed on the photo-sensitive element material, the upper transparent electrodes being connected to line materials of opaque materials through contact portions provided in an interlayer insulation film, and that the diffraction grating is formed from an opaque material in the same layer as the lower electrodes and another opaque material in the same layer as the line materials with the interlayer insulation film interposed therebetween.

Or, the fingerprint image input apparatus is further characterized in that the transparent protective film is formed, where the refraction factor of the transparent protective film is represented by nm, the refraction factor of a medium in which the finger is placed on the surface of the transparent protective film is represented by na, and the pitch and the width of the photo-sensitive elements are represented by P and x, respectively, with a depth d which satisfies the following equations:

$$\theta c = \sin^{-1}(na/nm)$$

$$d = (P-x)/(2 \tan \theta c)$$

Each of the switch elements may be formed from a thin film transformer, and the diffraction grating may include a metal film same as that for the source-drain electrodes of the thin film transistors and another metal film same as that for the gate electrodes of the thin film transistors, and further, an intermediate layer may be held between the metal films.

According to another aspect of the present invention, there is provided a method of producing the fingerprint image input apparatus, characterized in that a method of production of the photo-sensitive elements and the switch elements includes a plurality of repetitions of a step of forming and patterning an opaque material, and the diffraction grating is formed simultaneously in one or more of the repetitions of the opaque material forming and patterning step.

The method of producing the photo-sensitive elements may include the first step of forming lower electrodes using an opaque material, the second step of forming photo-sensitive materials on the lower electrodes, the third step of forming upper transparent electrodes on the photo-sensitive element materials, the fourth step of forming an interlayer insulation film on the upper transparent electrodes, and the fifth step of forming contact portions in the interlayer insulation film, forming line materials of an opaque material on the interlayer insulation film and interconnecting the upper transparent electrodes and the line materials through the contact portions, and the opaque material forming and patterning step in which the diffraction grating is formed simultaneously may be one or both of the first and fifth steps.

Or, the method of producing the switch elements includes the first step of forming source-drain electrodes using an opaque material, the second step of forming thin film semiconductor materials on the source-drain electrodes, the third step of forming an insulation film on the thin film semiconductor materials, and the fourth step of forming contact portions in the insulation film, forming line materials of an opaque material on the insulation film and interconnecting the source-drain electrodes and the line materials through the contact portions, and the opaque material forming and patterning step in which the diffraction grating is formed simultaneously may be one or both of the first and fourth steps.

Or else, the method of producing the switch elements includes the first step of forming and patterning thin film semiconductor materials, the second step of forming an insulation film on the thin film semiconductor materials, the third step of forming gate electrodes using an opaque material on the insulation film, the fourth step of forming source-drain regions at the opposite ends of each of the thin film semiconductor materials, the fifth step of forming an interlayer insulation film between the gate electrodes and the source-drain regions, and the sixth step of forming contact portions in the interlayer insulation film, forming line materials of an opaque material on the insulation film and interconnecting the source-drain regions and the line materials through the contact portions, and the opaque material forming and patterning step in which the diffraction grating is formed simultaneously may be one or both of the third and sixth steps.

In the present invention, in an opening provided in the proximity of a picture element area of a conventional image sensor in order to pass therethrough light emitted from a light source, a diffraction grating is provided commonly including one or more opaque materials which form a photo-sensitive element of an image sensor. Consequently, a diffraction grating which is conventionally provided independently in an optical element is unnecessary, and accordingly, the number of parts is reduced.

Further, where a switch element is formed from a thin film transistor, the switch element and the diffraction grating can be formed simultaneously by forming a metal film same as that for the source-drain electrodes of the thin film transistor and another metal film same as that for the gate electrode of the thin film transistor with an interlayer insulation film interposed therebetween.

The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENTS

Figure 2:
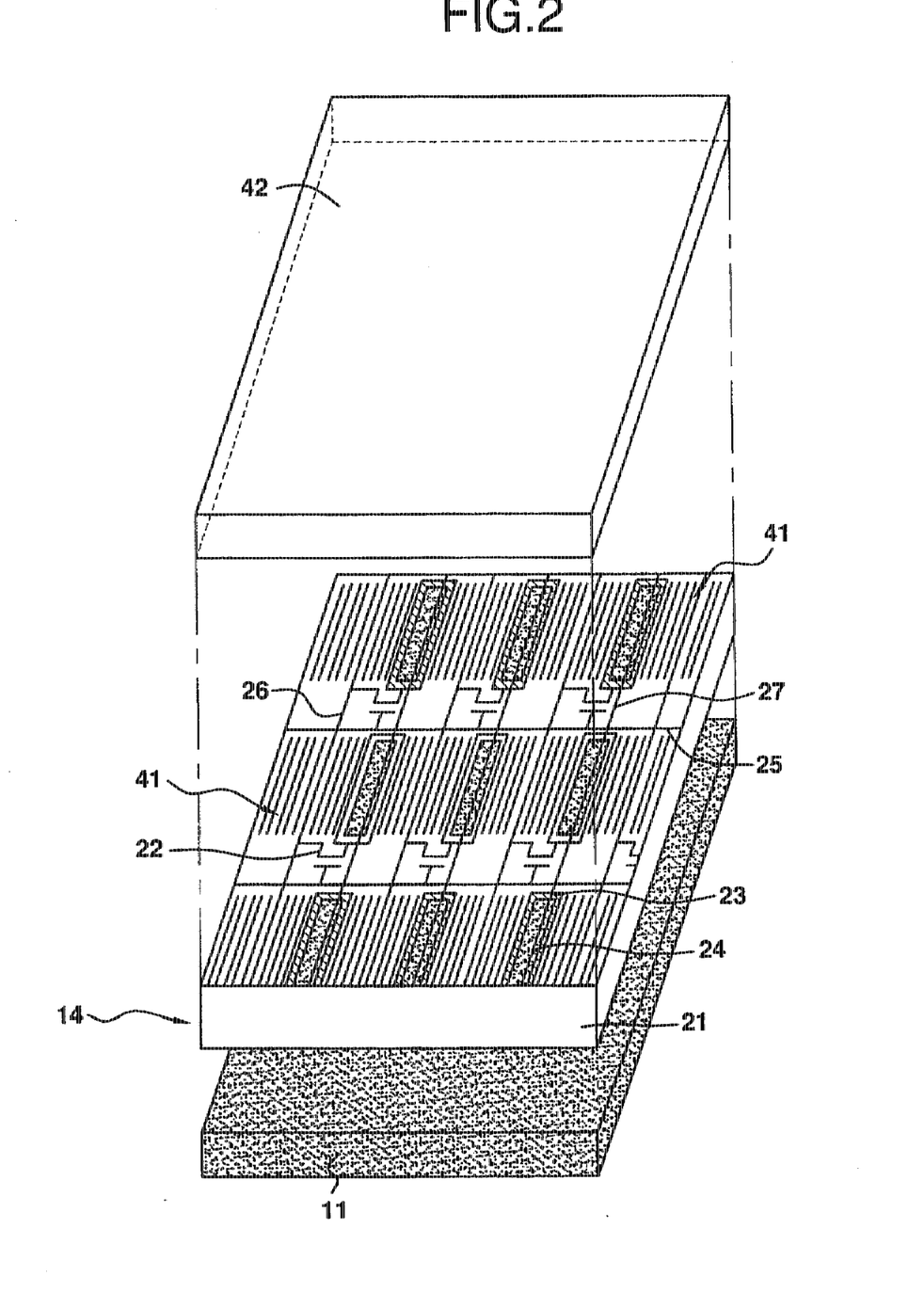
FIG. 2 is an exploded perspective view of an embodiment of the present invention.

Embodiments of the present invention are described below with reference to the drawings. FIG. 2 shows an exploded perspective view of an embodiment of a fingerprint image input apparatus constructed in accordance with the present invention. In the present embodiment, the fingerprint image input apparatus includes two-dimensional image sensor 14, planar light source 11, and transparent protective film 42. Two-dimensional image sensor 14 includes diffraction grating 41 formed on transparent substrate 21, photo-sensitive elements 24, switch elements 22, switching lines 25, signal reading lines 26, bias applying lines 27, and light interception plates 23 disposed below photo-sensitive elements 24. In the present embodiment, two-dimensional image sensor 14 provided with light interception plates 23 is provided on planar light source 11, and two-dimensional image sensor 14 is covered with transparent protective film 42.

Figure 3A:
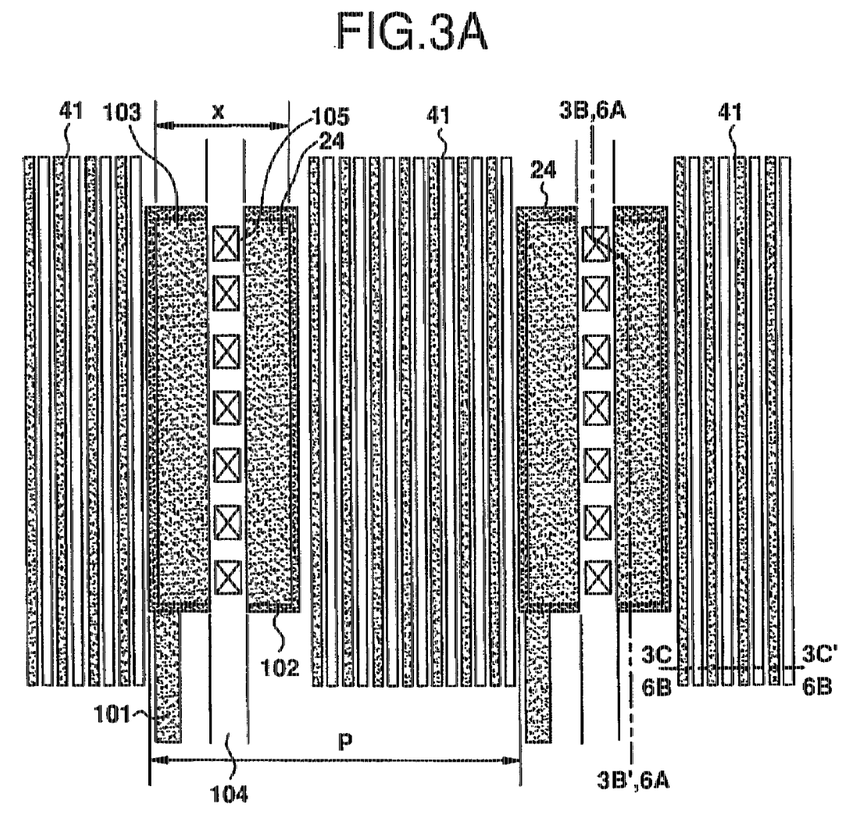
FIGS. 3A, 3B and 3C show plan and sectional views showing an example of a diffraction grating and a photo-sensitive element of the present invention.
Figure 3B:
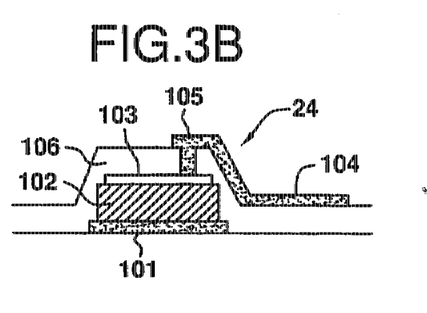
Figure 3C:
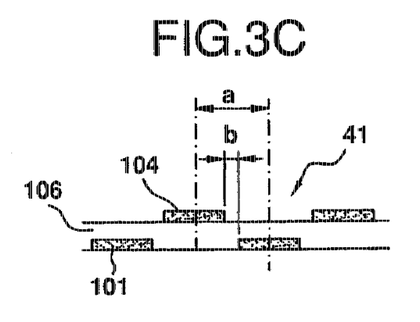

FIG. 3A shows a plan view showing details of an example of diffraction grating 41 and photo-sensitive elements 24 formed on two-dimensional image sensor 14, FIG. 3B shows a sectional view taken along line A—A' of FIG. 3A, and FIG. 3C shows a sectional view taken along line B—B' of FIG. 3A. Each of photo-sensitive elements 24 is composed of lower electrode 101 formed from an opaque material, photo-sensitive material 102, and upper transparent electrode 103. As shown in FIG. 3B, upper transparent electrode 103 is connected to line material 104 formed from an opaque material through contact portion 105 provided on interlayer insulation film 106. Meanwhile, diffraction grating 41 is, as shown in FIG. 3C, formed at pitch a and with width b of slits from two opaque materials (same material as lower electrodes 101 and line materials 104) between which interlayer insulation film 106 is held.

Figure 4:
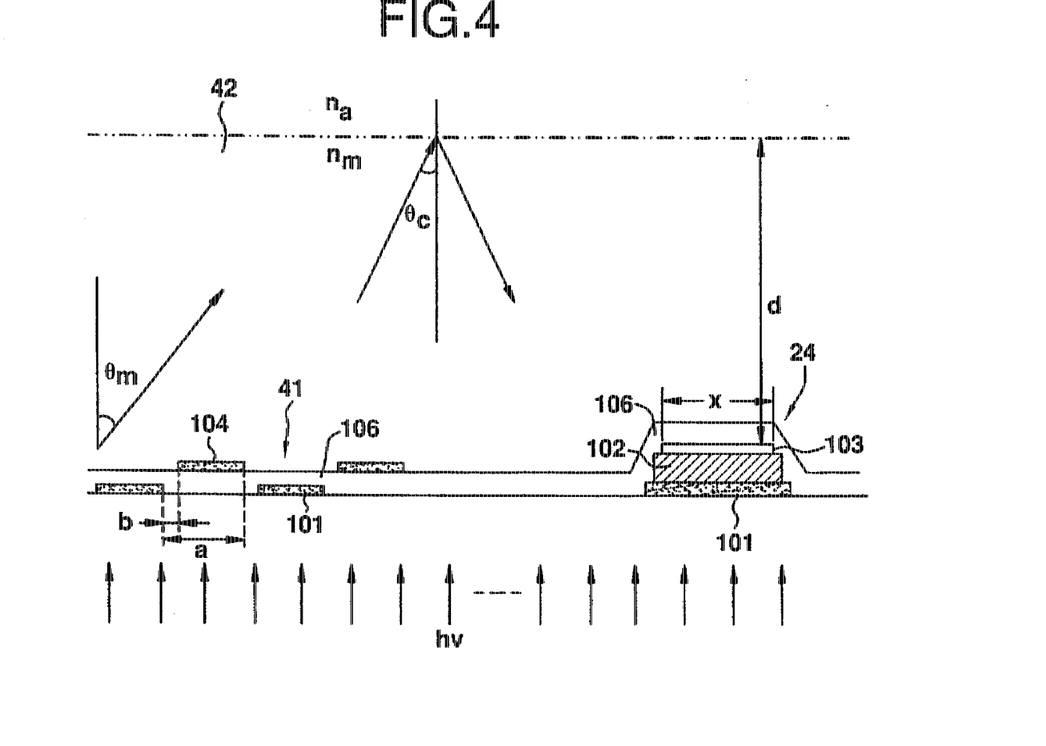
FIG. 4 is a diagrammatic view illustrating operation of the diffraction grating of the embodiment of FIG. 2.
Figure 5:
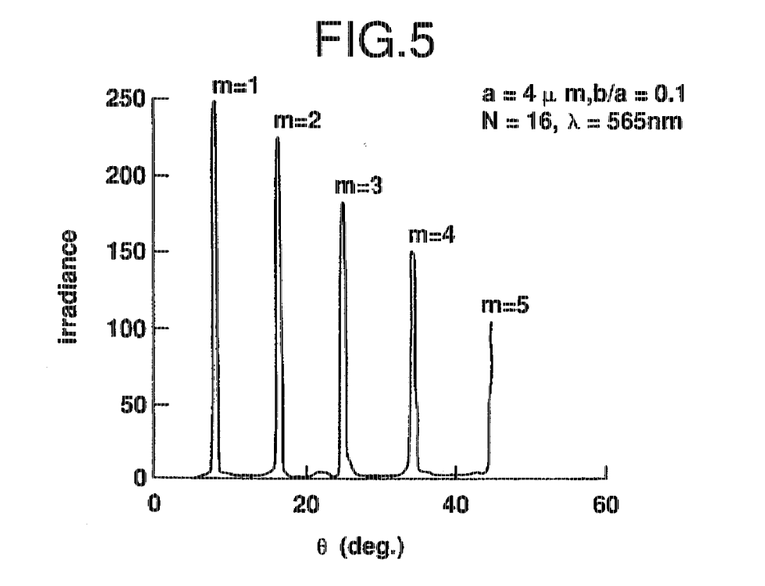
FIG. 5 is a graph illustrating a result of calculation of the relationship between the diffraction angle and the irradiance of diffraction light in the embodiment of FIG. 2.

Operation of the present embodiment is described below with reference to FIG. 4. In FIG. 4, same components to those of FIGS. 2 and 3 are denoted by same reference numerals, and overlapping description thereof is omitted. Light emitted from planar light source 11 passes through transparent substrate 21 and comes to diffraction grating 41. When the light is incident perpendicularly to diffraction grating 41, intensity I of the diffraction light is given as a function of diffraction angle θ by the following equations (1) to (3):

$$I(\theta) = I_0 \left( \frac{\sin\beta}{\beta} \right)^2 \left( \frac{\sin N\alpha}{\sin\alpha} \right)^2 \quad (1)$$

$$\alpha = \pi \frac{a}{\lambda} \sin\beta \quad (2)$$

$$\beta = \pi \frac{b}{\lambda} \sin\theta \quad (3)$$

where a and b are the pitch and the width of the slits of diffraction grating 41, respectively, N is the number of the slits, $I_0$ is the intensity of diffraction light from any one of the slits in the θ=0 direction, and λ is the wavelength of the light. A result of the calculation of equations (1) to (3) when the numerical values are, for example, a=4 μm, b/a=0.1, N=16 and λ=565 nm is illustrated in FIG. 5. The axis of ordinate of FIG. 5 indicates the irradiance.

Here, the intensity of the diffraction light exhibits its maximum value with angle θm which satisfies the following diffraction equation (4):

$$a \sin \theta m = m\lambda, \quad m=0, \pm 1, \pm 2, \ldots \quad (4)$$

From equation (4), a manner in which diffraction light of the 0th order of the perpendicular incident light corresponding to m=0 is highest in intensity and the intensity of diffraction light of the perpendicular incident light gradually decreases in the order of diffraction light of the first order (m=1) and diffraction light of the second order (m=2) can be observed. From diffraction light which satisfies θm>θc, a fingerprint image input of a high contrast is realized based on the principle of fingerprint image enhancement by total reflection described above. Where the refraction factors of the medium (air) in which the finger is placed and protective film 42 are represented by na and nm, respectively, critical angle θc is given by the following equation:

$$\theta c = \sin^{-1}(na/nm) \quad (5)$$

For example, when na=1 and nm=1.8, critical angle θc is approximately 34 degrees. Accordingly, in this instance, since total reflection occurs only where incidence angle θc is larger than approximately 34 degrees, in the example of numerical values of FIG. 5, fingerprint image enhancement by total reflection is realized with diffraction light of the orders upper than the fourth order whose incidence angle θc is larger than approximately 34 degrees. Here, in order for totally reflected light to be detected efficiently by the photo-sensitive element, thickness d of protective film 42 must be designed so as to satisfy the following equation:

$$d=(P-x)/(2 \tan \theta c) \quad (6)$$

where P is the pitch of photo-sensitive elements 24 shown in FIG. 3A, and x is the width of photo-sensitive elements 24, or more specifically, the width of upper transparent electrodes 103.

Figure 6A:
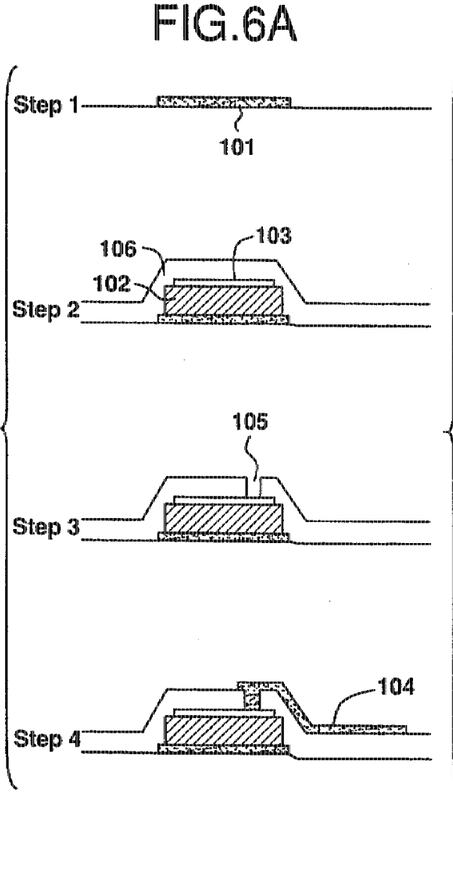
FIGS. 6A and 6B are schematic views illustrating a method of production of the embodiment of the present invention.
Figure 6B:
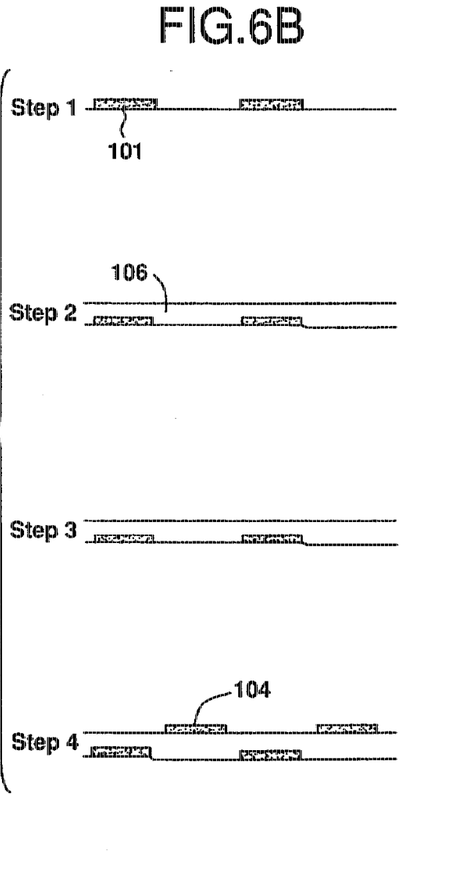

A method of producing the two-dimensional image sensor having the construction of FIGS. 3A–C is described below with reference to FIGS. 6A–B. First in step 1, a Cr layer of 100 nm thick is formed by sputtering, and a desired shape is formed by patterning. The element thus formed serves as lower electrode 101 of a photodiode and part of a diffraction grating. In step 2, an hydrogenated amorphous layer (a-Si:H) of 1 μm thick which makes photo-sensitive material 102 and a p-type a-Si:H layer of 50 nm thick are successively formed by a plasma CVD method, and then, on the layers, an ITO layer is formed with the thickness of 100 nm as upper transparent electrode 103 and then patterned. A photodiode of the p-i-Schottky type is formed in this manner. Further, $SiO_2$ is formed into a film of 300 nm thick as interlayer insulation film 106. In step 3, contact portion 105 is formed on interlayer insulation film 106. In step 4, Al is formed into a film of 300 nm thick by sputtering and then patterned. The Al layer functions as line material 104 for applying a bias voltage to the photodiode and as part of the diffraction grating.

It is to be noted that, while the example wherein the diffraction grating disposed on the image sensor is formed from two layers of opaque materials including the lower electrode and the bias applying line of the photo-sensitive element is described, the material which constructs the diffraction grating of the present invention is not limited to these. For example, a metal line material used to form a thin film transistor or the like as a switch element may be used.

Figure 7A:
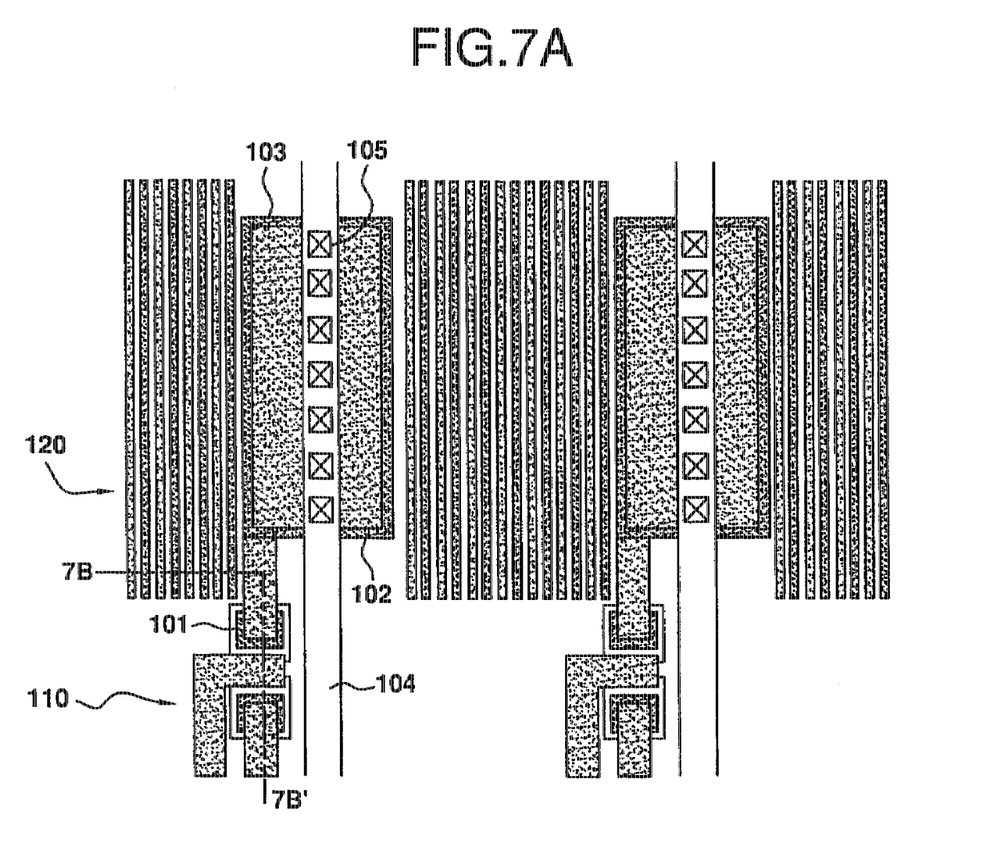
FIG. 7A is a plan view and FIG. 7B is a sectional view of another example of a diffraction grating and a photo-sensitive element formed on an image sensor area of an apparatus of the present invention.

FIG. 7A is a plan view showing details of another example of a diffraction grating and a photo-sensitive element formed on the image sensor section of such a fingerprint image input apparatus as described above, and FIG. 7B shows a sectional view taken along line A—A' of FIG. 7A. In the present example, as a switch element, thin film transistor 110 is used.

Figure 7B:
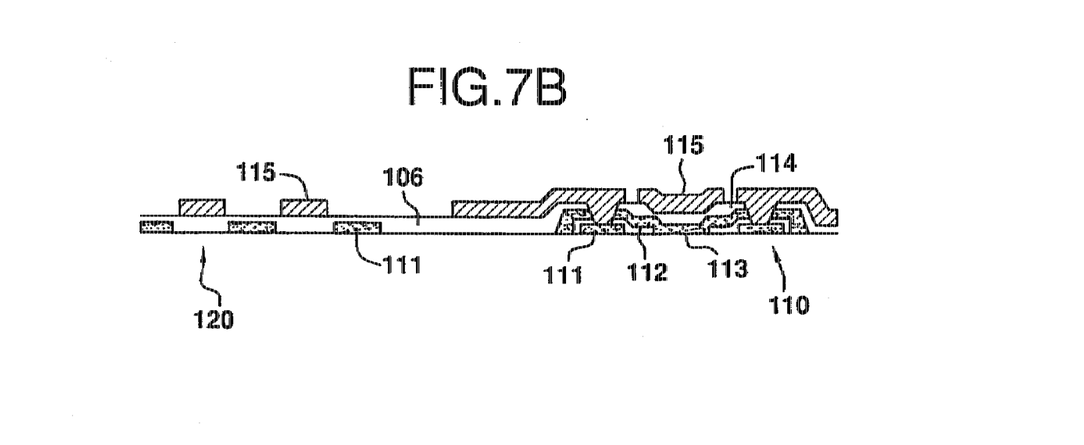

The photo-sensitive element is composed of lower electrode 101 formed from an opaque material, photo-sensitive material 102, and upper transparent electrode 103. Meanwhile, as shown in FIG. 7B, thin film transistor 110 is composed of source-drain electrode metal film 111, ohmic junction material 112, semiconductor layer 113, gate insulation film 114, and gate electrode metal film 115. This thin film transistor 110 operates as a switch as the resistance between the source and drain electrodes is controlled by a voltage applied to gate electrode 115.

Further, diffraction grating 120 is composed of source-drain electrode metal film 111 and gate electrode metal film 115 on interlayer insulation film 106 of thin film transistor 110 as shown in FIG. 7B. Accordingly, since diffraction grating 120 is formed from components common to those of thin film transistor 110, it can be produced simultaneously with the thin film transistor. Consequently, the production steps and the production cost can be reduced.

Figure 8:
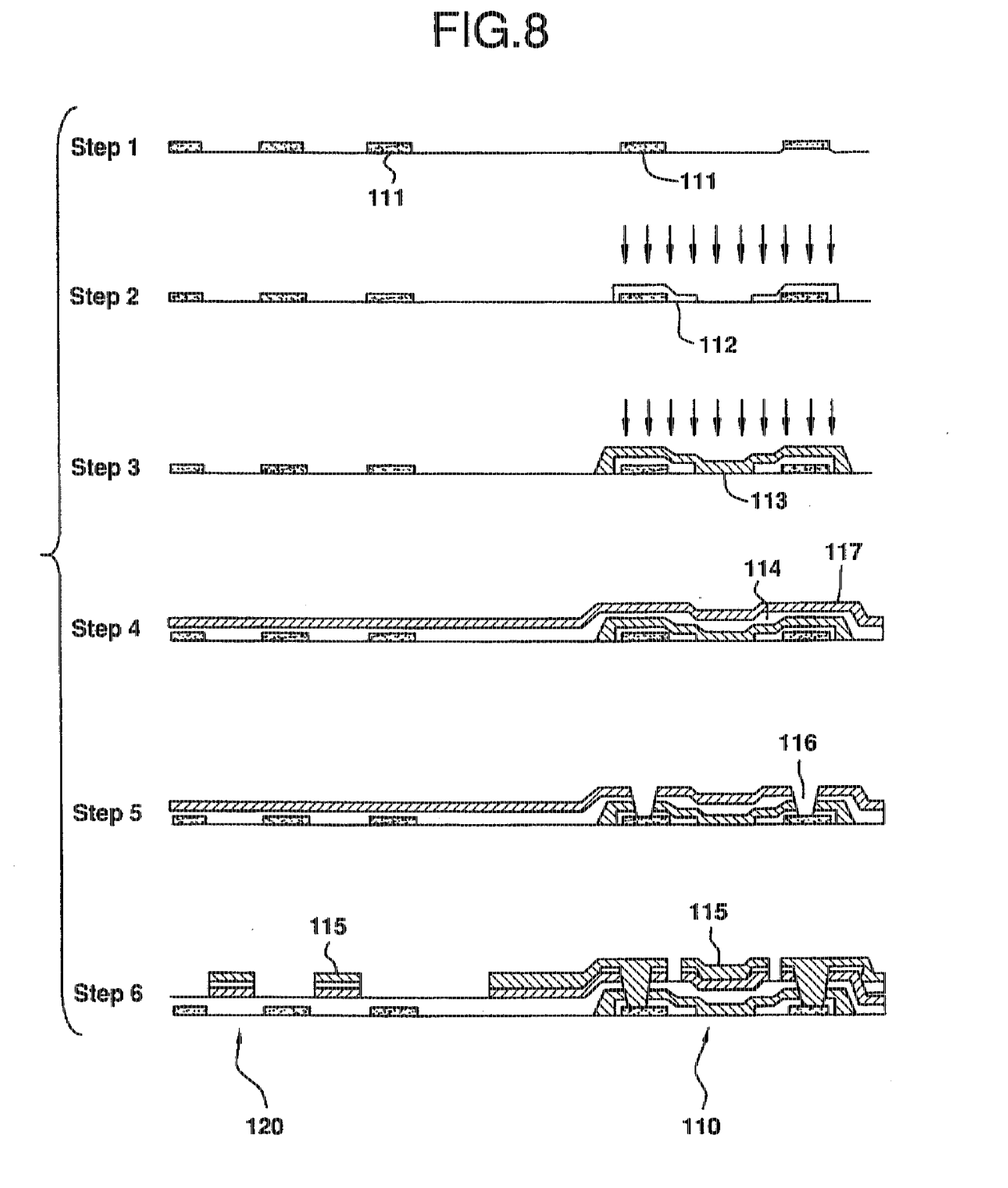
FIG. 8 is a schematic view illustrating a method of production of the embodiment of the present invention.

A method of producing the two-dimensional image sensor of the construction of FIGS. 7A–B is described with reference to FIG. 8. In step 1, a WSi layer of 100 nm thick is formed by sputtering and then patterned. The layer functions as source-drain electrode metal film 111 of the TFT (thin film transistor) and part of the diffraction grating. In step 2, as ohmic junction material 112 to the source-drain electrodes of the TFT, a polycrystalline silicon layer (poly-Si) layer of 75 nm thick is formed by an LPCVD method and then converted into an n⁺ layer or p+ layer by ion implantation, whereafter it is patterned. In step 3, an a-Si layer is formed with the thickness of 75 nm by an LPCVD method and then converted into a poly-Si layer by laser annealing. The layer is patterned to form a channel region of the TFT. Further in step 4, $SiO_2$ is formed in a layer of 125 nm thick as gate insulation film 114 by an LPCVD method, and then an n⁺-type poly-Si film is formed with the thickness of 60 nm by an LPCVD method. This n⁺-type poly-Si film functions as a protective film for Al of the gate electrode material. In step 5, contact portion 116 is formed in the n⁺-type poly-Si film and gate insulation film 114. In step 6, Al is formed into a film of 300 nm thick by sputtering and then patterned. This Al layer functions as line materials for the gate electrode and the source-drain electrodes of the TFT and part of the diffraction grating.

Figure 9:
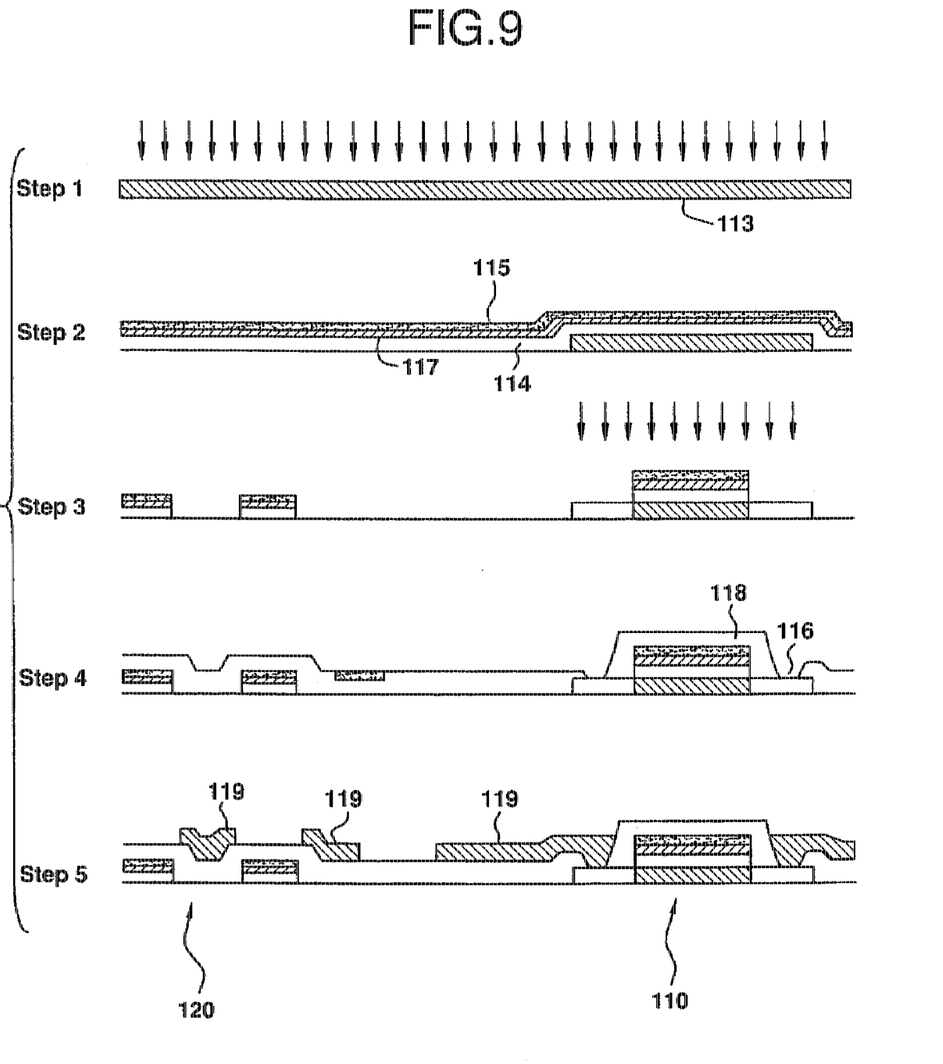
FIG. 9 is a schematic view illustrating a method of production of the embodiment of the present invention.

While the method of production wherein a diffraction grating is formed simultaneously making use of the process of production of a poly-Si TFT of the forward staggered type is described above, the method of producing a diffraction grating of the present invention is not limited to that for a poly-Si TFT of the forward staggered type. For example, it is possible to form a diffraction grating simultaneously making use of a method of production of a poly-Si TFT of the planar type as illustrated in FIG. 9. In step 1, an a-Si layer is first formed with the thickness of 75 nm by an LPCVD and then converted into a poly-Si layer by laser annealing. This layer is patterned to form a channel region of the TFT. In step 2, a $SiO_2$ layer of 125 nm thick is formed by an LPCVD method, and then an N⁺-type poly-Si layer of 60 nm thick is formed by an LPCVD method, whereafter a WSi layer of 100 nm thick is formed by sputtering. In step 3, those layers are patterned leaving portions which are to make the gate electrode and part of the diffraction grating. Thereafter, ion implantation of the self-alignment type is performed while masking the gate electrode, and then annealing is performed for two hours at 600° C. to form ohmic junction materials at the opposite ends of the channel region of the TFT. In step 4, $SiO_2$ is formed into a layer of 300 nm thick as interlayer insulation film 118 and then patterned to form contact portion 116. In step 5, Al is formed into a layer of 300 mm thick by sputtering and then patterned. This Al functions as the line materials for the source-drain electrodes of the TFT and as part of the diffraction grating.

While the process of production wherein a diffraction grating is produced making use only of the photodiode process or the TFT process is described as an example above, the method of producing a diffraction grating of the present invention is not limited to this. In particular, a diffraction grating can be formed in a similar manner using an arbitrary number of opaque layers from among arbitrary opaque layers formed in the TFT process (for example, a gate electrode metal film, a source-drain electrode metal film) and arbitrary opaque layers formed in the photodiode process (for example, a metal film for the lower electrode of a photodiode, a metal film for bias application).

While, in the examples described above, a two-dimensional image sensor is described as an example, it is otherwise possible to input a fingerprint image while a linear image sensor is moved relative to a finger. Also examples wherein a diffraction grating is constructed by a similar method with a similar construction in the proximity of a photo-sensitive element of a linear image sensor are considered to be modifications of the present invention.

Figure 10:
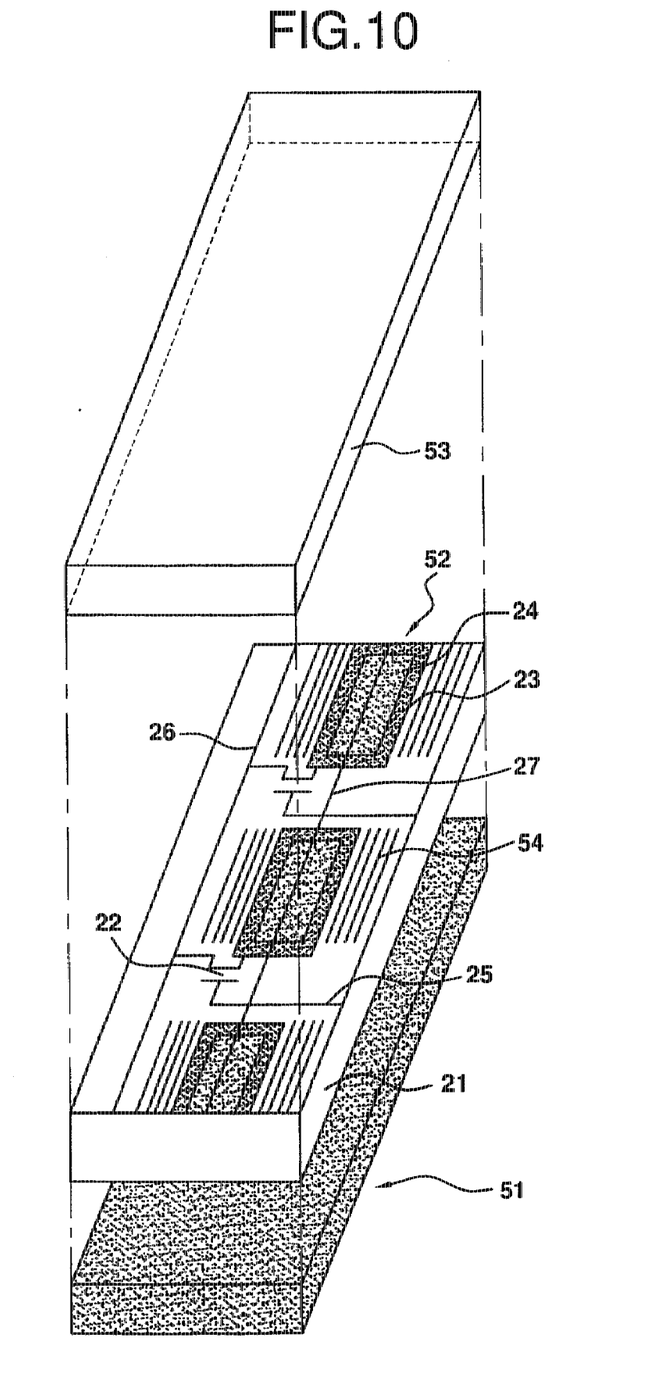
FIG. 10 is an exploded perspective view of another embodiment of the present invention.

FIG. 10 is a perspective view showing the construction of an image sensor section of such a fingerprint image input apparatus as just described. The image sensor section is composed of linear light source 51, linear image sensor 52 provided on linear light source 51, and transparent protective film 53 covering over linear image sensor 52. Linear image sensor 52 includes diffraction grating 54 formed on transparent substrate 21, photo-sensitive elements 24, switch elements 22, switching lines 25, signal reading line 26, bias applying lines 27, and light interception plates 23 disposed below photo-sensitive elements 24. The constructions of diffraction grating 54 and photo-sensitive elements 24 are similar to those shown in FIG. 3.

Operation of the construction is described next. Light emitted from linear light source 51 passes through linear image sensor 52 and comes to diffraction grating 54, by which its passage is changed so that it is irradiated upon the finger, and reflected light from the finger is detected by photo-sensitive elements 24. In other words, fingerprint information of a line-like small region located just above the photo-sensitive element train is inputted. Here, fingerprint enhancement which makes use of total reflection is realized as described hereinabove. Further, a fingerprint image is obtained by repeating the inputting described above while the finger is moved relative to linear image sensor 52.

It is to be noted that, while the diffraction grating in the examples described above is formed from two layers of opaque materials, naturally it is possible to construct an ordinary diffraction grating using only one layer of the opaque materials.

As described above, according to the present invention, since, in an opening provided in the proximity of a picture element area of a conventional image sensor in order to pass therethrough light emitted from a light source, a diffraction grating is provided commonly including one or more opaque materials which form a photo-sensitive element of an image sensor, a diffraction grating which is conventionally provided independently in an optical element is unnecessary. Accordingly, since the number of parts is reduced, reduction in size and cost can be realized.

Further, according to the present invention, where a switch element is formed from a thin film transistor, the switch element and the diffraction grating can be formed simultaneously by forming a metal film same as that for the source-drain electrodes of the thin film transistor and another metal film same as that for the gate electrode of the thin film transistor with an interlayer insulation film interposed therebetween, and consequently, reduction in cost can be achieved by reduction in process of production.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A fingerprint image input apparatus, comprising:
   one of a planar or linear light source;
   an image sensor provided on said light source including a transparent substrate in which a plurality of photo-sensitive elements, a plurality of switch elements for individually switching outputs of said photo-sensitive elements, and a diffraction grating have been formed; and
   a transparent protective layer provided on said image sensor and having a surface with which a finger can contact, said transparent protective layer reflecting light, which has been emitted from said light source and diffracted by said diffraction grating, so that the light is introduced into said photo-sensitive elements.

2. A fingerprint image input apparatus as claimed in claim 1, characterized in that each of said photo-sensitive elements comprises a lower electrode formed from an opaque material in a lower layer, a photo-sensitive material formed on said lower electrode, and an upper transparent electrode formed on said photo-sensitive element material, said upper transparent electrode is connected to line materials of said plurality of switch elements, formed from another opaque material in an upper layer, through contact portions provided in an interlayer insulation film, and that said diffraction grating is formed from said opaque material in said lower layer and said another opaque material in said upper layer with said interlayer insulation film interposed therebetween.

3. A fingerprint image input apparatus as claimed in claim 1, characterized in that said transparent protective layer is formed with a depth d which satisfies the following equations:

$$\theta_c = \sin^{-1}(na/nm)$$

$$d = (P-x)/(2 \tan \theta_c)$$

where the refraction factor of said transparent protective layer is represented by nm, the refraction factor of a medium in which said finger is placed on said surface of said transparent protective layer is represented by na, and the pitch and width of said photo-sensitive elements are represented by P and x, respectively.

4. A fingerprint image apparatus as claimed in claim 1, characterized in that each of said switch elements is formed from a thin film transistor, and said diffraction grating comprises a first metal film and a second metal film such that said first metal film is also used to form in a first layer source-drain electrodes of said thin film transistor and said second metal film is used to form gate electrodes of said thin film transistor in a second layer, and an intermediate layer is formed between said first and second metal films of said first and second layers.

5. A method of producing a fingerprint image input apparatus, comprising the steps of:
   forming one of a planar or linear light source;
   providing an image sensor on said light source, including a transparent substrate in which a plurality of photo-sensitive elements, a plurality of switch elements for individually switching outputs of said photo-sensitive elements, and a diffraction grating have been formed;
   and providing a transparent protective layer on said image sensor and having a surface with which a finger can contact.

6. A method of producing the fingerprint image input apparatus according to claim 5, characterized in that production of said photo-sensitive elements and said plurality of switch elements, and said diffraction grating includes multiple repetitions of a step of forming and patterning an opaque material.

7. A method of producing a fingerprint image input apparatus as claimed in claim 6, characterized in that the method of producing said photo-sensitive elements includes:

a first step of forming lower electrodes using an opaque material;

a second step of forming photo-sensitive element materials on said lower electrodes;

a third step of forming upper transparent electrodes on said photo-sensitive element materials;

a fourth step of forming an interlayer insulation film on said upper transparent electrodes;

a fifth step of forming contact portions in said interlayer insulation film, forming line materials of said plurality of switch elements of another opaque material on said interlayer insulation film and interconnecting said upper transparent electrodes and said line materials through said contact portions, and forming and patterning said diffraction grating simultaneously during at least one of said first and fifth steps.

8. A method of producing a fingerprint image input apparatus as claimed in claim 6, characterized that the method of producing said switch elements includes:

a first step of forming source-drain electrodes using an opaque material;

a second step of forming thin film semiconductor materials on said source-drain electrodes;

a third step of forming an insulation film on said thin film semiconductor materials;

a fourth step of forming contact portions in said insulation film, forming line materials of another opaque material on said insulation film and interconnecting said source-drain electrodes and said line materials through said contact portions, and forming and patterning said diffraction grating simultaneously during at least one of said first and fourth steps.

9. A method of producing a fingerprint image input apparatus as claimed in claim 6, characterized in that the method of producing said switch elements includes:

a first step of forming and patterning thin film semiconductor materials;

a second step of forming an insulation film on said thin film semiconductor materials;

a third step of forming gate electrodes using an opaque material on said insulation film;

a fourth step of forming source-drain regions at opposite ends of said thin film semiconductor materials;

a fifth step of forming an interlayer insulation film between said gate electrodes and said source-drain regions;

a sixth step of forming contact portions in said interlayer insulation film, forming line materials of another opaque material on said insulation film and interconnecting said source-drain regions and said line material through said contact portions, and forming and patterning said diffraction grating simultaneously during at least one of said first and fourth steps.

* * * * *